US012544722B2

(12) United States Patent
Patel et al.

(10) Patent No.: US 12,544,722 B2
(45) Date of Patent: Feb. 10, 2026

(54) INFUSION/MIXER PUMP SYSTEM—PUMP WITH INTEGRATED GAS LIQUID MIXING VALVE IN AN ENCLOSURE

(71) Applicant: FLOW CONTROL LLC, Beverly, MA (US)

(72) Inventors: Akshaykumar Patel, Santa Ana, CA (US); Derrick Tran, Yorba Linda, CA (US); Humberto V. Meza, Trabuco Canyon, CA (US)

(73) Assignee: FLOW CONTROL LLC, Beverly, MA (US)

( * ) Notice: Subject to any disclaimer, the term of this patent is extended or adjusted under 35 U.S.C. 154(b) by 526 days.

(21) Appl. No.: 17/014,086

(22) Filed: Sep. 8, 2020

(65) Prior Publication Data

US 2021/0069655 A1   Mar. 11, 2021

Related U.S. Application Data

(60) Provisional application No. 62/896,855, filed on Sep. 6, 2019.

(51) Int. Cl.
*B01F 23/236* (2022.01)
*B01F 23/237* (2022.01)
(Continued)

(52) U.S. Cl.
CPC ...... *B01F 23/2362* (2022.01); *B01F 23/2363* (2022.01); *B01F 23/237621* (2022.01);
(Continued)

(58) Field of Classification Search
CPC .... A23L 2/54; B01F 2101/14; B01F 2101/16; B01F 23/236; B01F 23/2362;
(Continued)

(56) References Cited

U.S. PATENT DOCUMENTS 5,062,548 A   11/1991   Hedderick et al.
6,237,810 B1   5/2001   Credle, Jr.
(Continued)

FOREIGN PATENT DOCUMENTS

EP   3 360 844 A1   8/2018
EP   B 505 487 A1   7/2019
(Continued)

OTHER PUBLICATIONS https://www.merriam-webster.com/dictionary/manifold (Year: 2024).*
(Continued)

*Primary Examiner* — Edward F Landrum
*Assistant Examiner* — Adam M Eckardt
(74) *Attorney, Agent, or Firm* — William J. Barber; WARE FRESSOLA MAGUIRE & BARBER LLP

(57) ABSTRACT

An integrated infuser/mixer pump system features a liquid inlet configured to receive a liquid drawn from a liquid source, a gas inlet configured to receive an inlet gas from a gas source, a pump and motor combination configured to received the liquid and provide pumped liquid, a gas/liquid mixture chamber configured to receive the pumped liquid and the inlet gas, and mix the liquid and the inlet gas into a gas-infused mixture, and a gas-infused mixture outlet configured to provide the gas-infused mixture; the gas inlet having a gas liquid mixing valve with a mixing orifice that has a mixing orifice size dimensioned to provide the inlet gas to the gas/liquid mixture chamber with an inlet gas volumetric flow rate in order to mix the pumped liquid and the inlet gas with a predetermined mixture ratio that depends on the mixing orifice size.

9 Claims, 4 Drawing Sheets

Isometric view of an infusion pump for enclosing in the pump enclosure in Figure 3

(51) Int. Cl.
B01F 101/14 (2022.01)
B01F 101/16 (2022.01)

(52) U.S. Cl.
CPC ..... *B01F 23/23765* (2022.01); *B01F 2101/14* (2022.01); *B01F 2101/16* (2022.01)

(58) Field of Classification Search
CPC .......... B01F 23/2363; B01F 23/237621; B01F 23/23765; F16K 27/067; F16K 31/602; F16K 31/607; F16K 5/0647; F16K 5/0657; F16K 27/06; F16K 31/60
See application file for complete search history.

(56) References Cited

U.S. PATENT DOCUMENTS

| | | | |
|---|---|---|---|
| 8,438,969 | B2 | 5/2013 | Gold et al. |
| 8,578,839 | B2 | 11/2013 | Nielsen et al. |
| 8,857,797 | B2 | 10/2014 | Kumar et al. |
| 9,004,743 | B2 | 4/2015 | Wood et al. |
| 9,346,024 | B2 | 5/2016 | Page et al. |
| 9,623,383 | B1 | 4/2017 | Kleinrichert |
| 9,701,527 | B2 | 7/2017 | Tansey |
| 9,895,667 | B2 | 2/2018 | Mcdonald et al. |
| 9,955,710 | B2* | 5/2018 | Hyde .................... B01F 23/236 |
| 9,962,663 | B2 | 5/2018 | Kimberlin et al. |
| 10,017,373 | B2 | 7/2018 | Kleinrichert |
| 10,125,762 | B2 | 11/2018 | Pangburn et al. |
| 10,182,587 | B2 | 1/2019 | Lundberg et al. |
| 10,252,900 | B2 | 4/2019 | Cook |
| 11,617,994 | B2* | 4/2023 | Humphrey ............ B01F 23/236 261/53 |
| 2011/0260344 | A1* | 10/2011 | Shanahan ......... B01F 23/23124 261/24 |
| 2013/0270722 | A1 | 10/2013 | Phillips et al. |
| 2015/0329343 | A1* | 11/2015 | Kleinrchert ............... A23F 3/00 222/146.6 |
| 2016/0017882 | A1 | 1/2016 | Meza et al. |
| 2018/0085723 | A1 | 3/2018 | Perkins et al. |
| 2018/0236417 | A1 | 8/2018 | Wilburn Borders |
| 2018/0290113 | A1 | 10/2018 | Peirsman et al. |
| 2018/0317524 | A1 | 11/2018 | Jennings, III |
| 2018/0318777 | A1 | 11/2018 | Hartmann |
| 2019/0135606 | A1* | 5/2019 | Perkins .................. B01F 23/00 |
| 2020/0094205 | A1* | 3/2020 | Kamimura ............. B01F 25/64 |
| 2020/0215498 | A1* | 7/2020 | Giardino .................. B67D 1/10 |

FOREIGN PATENT DOCUMENTS

| | | |
|---|---|---|
| WO | 2013/006321 A1 | 1/2013 |
| WO | 2019/117406 A1 | 6/2019 |
| WO | 2019/134017 A1 | 7/2019 |
| WO | 2019/157015 A1 | 8/2019 |

OTHER PUBLICATIONS https://www.merriam-webster.com/dictionary/fitting (Year: 2024).*
"Curtis Nitro Infuser" Wilbur Curtis, wilburcurtis.com, [Document Modified: Sep. 20, 2018 2:08:08 pm]; https://cdn.wilburcurtis.com/sites/default/files/product-brochures/F-5305.pdf; pp. 1-2.
"Brood Nitro V2PX Instruction Manual", Brood, brood.com, [Document Modified: Jul. 17, 2019 1:19:07 AM]; https://docs.wixstatic.com/ugd/1ed9d0_a3c4d7ab22504c8d81dbd3f0d4711493.pdf; pp. 1-12.
"Nitro Cold Brew System", The Coffee Scent, thecoffeescent.com, Apr. 26, 2018; https://web.archive.org/web/20180426004954/http://www.thecoffeescent.com.sg/nitro-cold-brew-coffee-system; pp. 1-4.

* cited by examiner

Examples of Nitrogen Gas Infused Mixing Assembly for Coffee
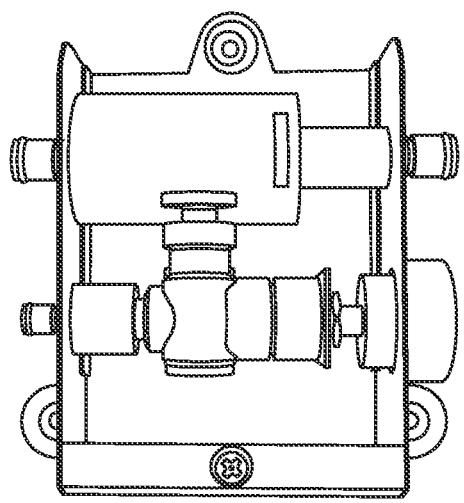
FIG. 1A
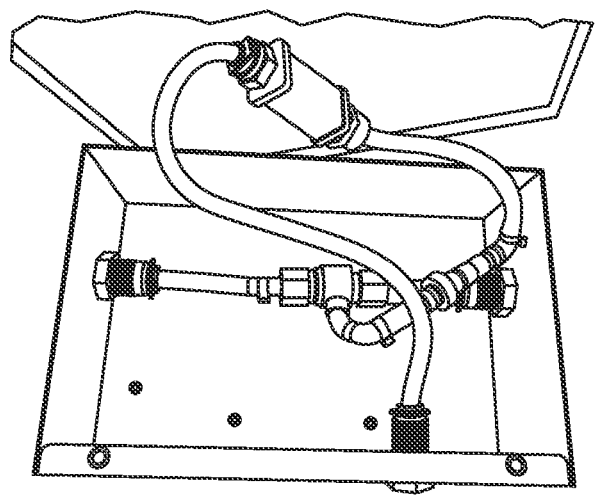
FIG. 1B
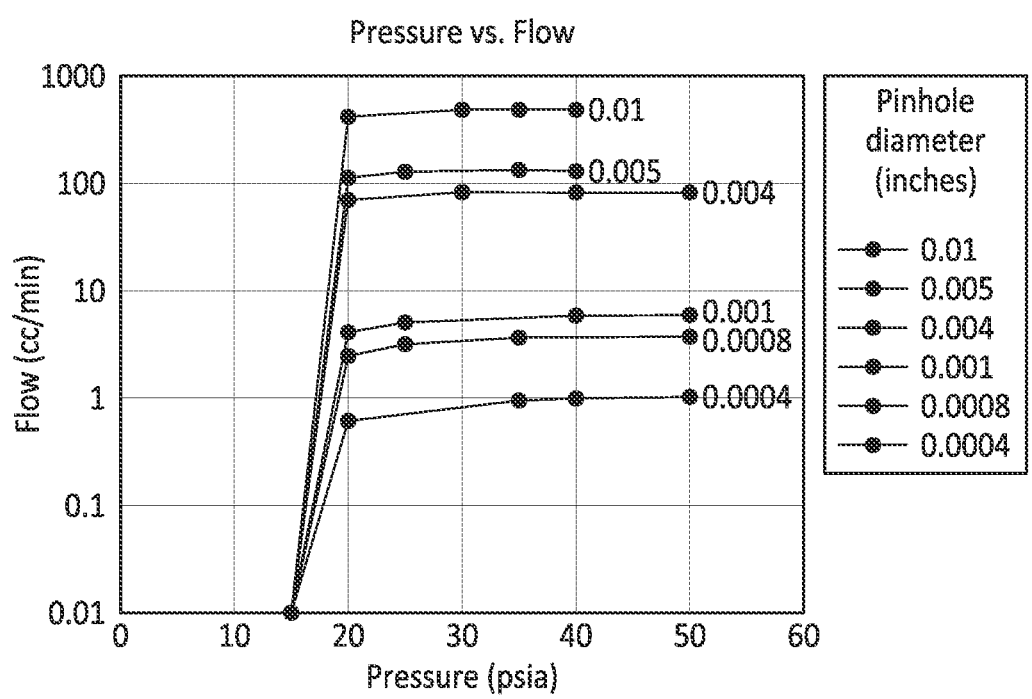
FIG. 2: Flow vs. Pressure through Small Orifices

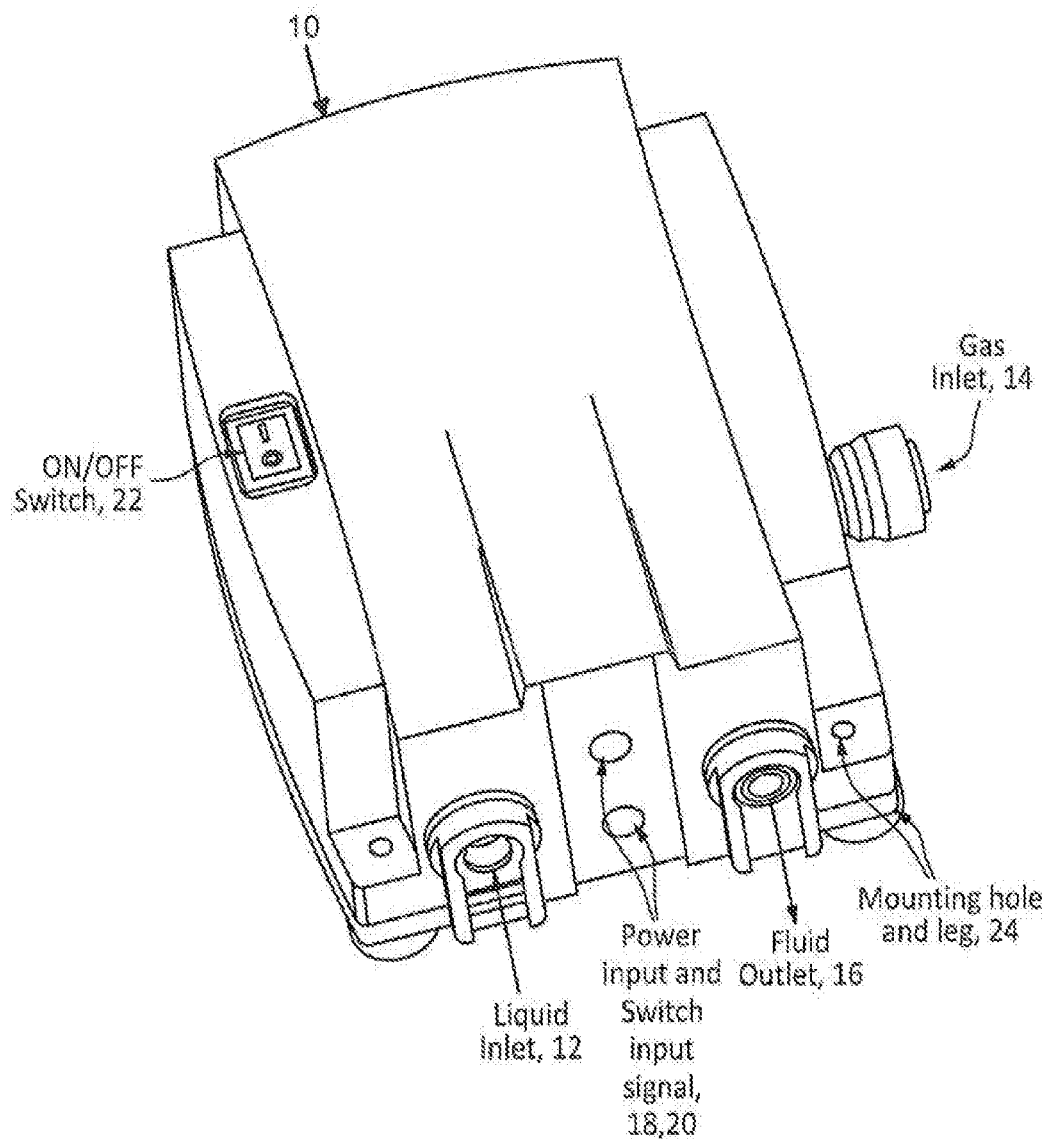
FIG. 3: Isometric view of a box or pump enclosure

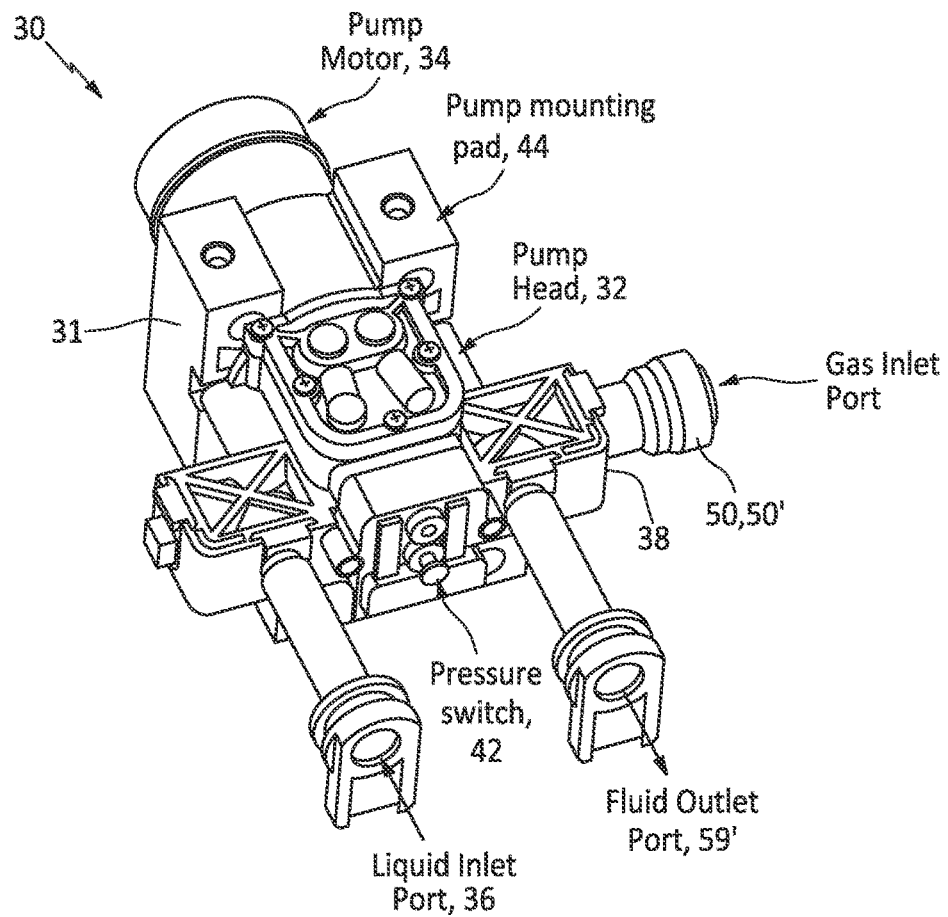
FIG. 4: Isometric view of an infusion pump for enclosing in the pump enclosure in Figure 3
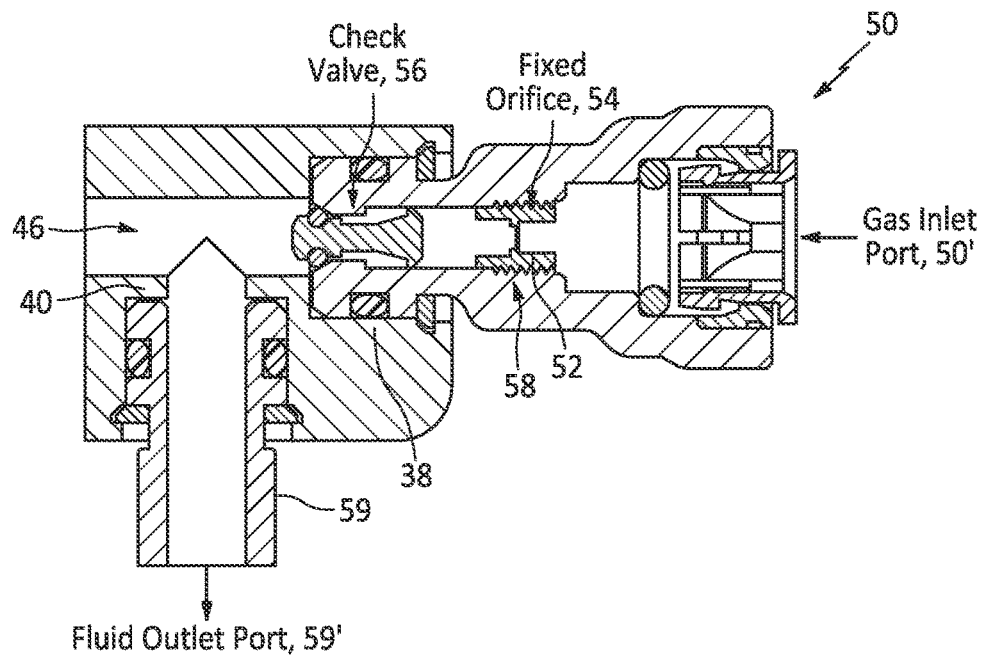
FIG. 5: Cross-section view of a gas inlet fitting assembled on the pump head

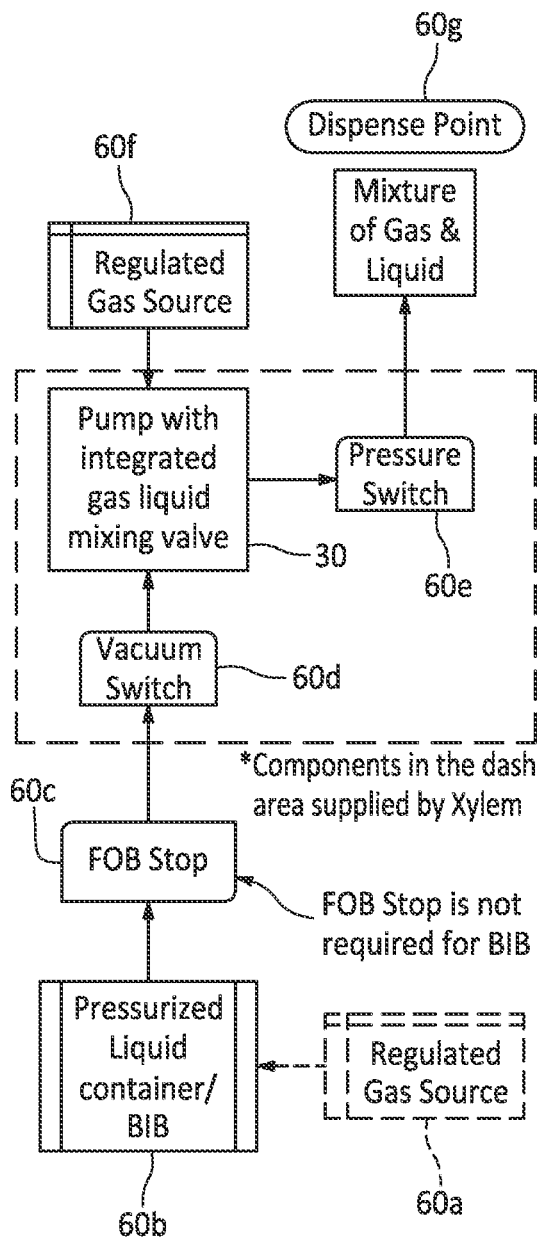
*FIG. 6*: Typical system plumbing diagram using a vacuum switch
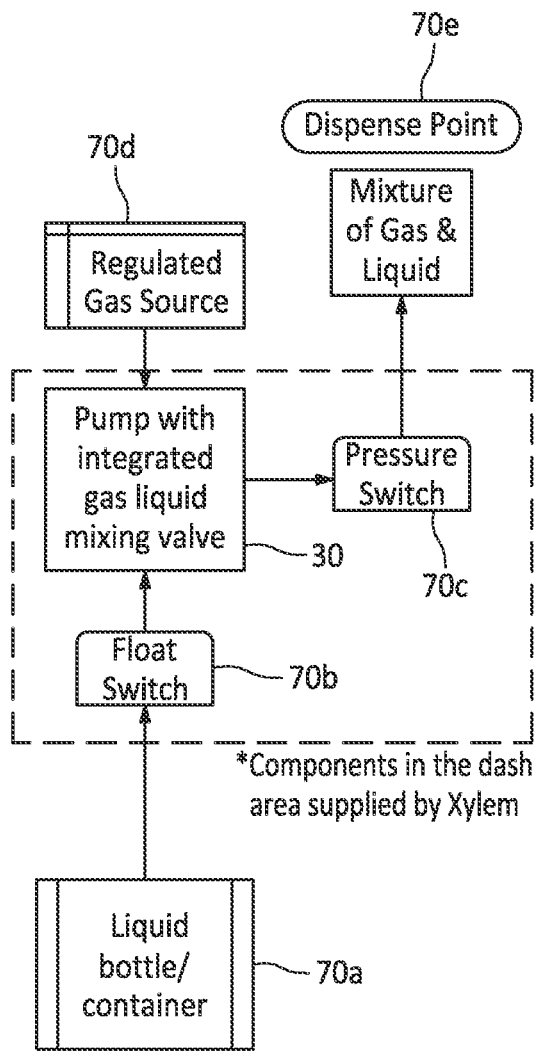
*FIG. 7*: Typical system plumbing diagram using a float switch

INFUSION/MIXER PUMP SYSTEM—PUMP WITH INTEGRATED GAS LIQUID MIXING VALVE IN AN ENCLOSURE

CROSS-REFERENCE TO RELATED APPLICATION

This application claims benefit to provisional patent application Ser. No. 62/896,855, filed 6 Sep. 2019, which is hereby incorporated by reference in its entirety.

BACKGROUND OF THE INVENTION

1. Field of the Invention

The present invention relates to a gas liquid infusion system, e.g., for mixing, infusing or carbonating beverage liquids (such as coffee, tea, milk, soda, beer, wine, spirits and industrial fluids) with a gas (such as nitrogen (N2), or carbon dioxide (CO2), or a blend of N2 and CO2).

2. Brief Description of Related Art

The following dispensing systems use proprietary mixing devices to nitrogenate cold brew coffee. Mixing devices used here are standalone components in terms of a big tank or a small manifold. They either use a high pressure pump or pressurized keg to drive liquid to the tank or manifold.
The dispensing systems include:
Bunn Nitron Cold Brew (https://www.bunn.com/Iced and Cold Draft Coffee),
Cornelius Nitropro (http://nitropro-cornelius.com/),
Joetap (http://joetap.com/home/), and
Micromatic (https://www.micromatic.com/nitro-cold-brew-coffee-on-tap)

Some of the Shortcomings of the Above Mentioned Devices

Some of the shortcomings of the above mentioned devices include:
These devices use multiple parts, and are time-consuming and costly to assemble.
These devices require frequent adjustments/calibrations to achieve a desired mixing ratio due to the nature of the components used, e.g., a ball or a needle typed valve.
They are for a single purpose application such as Nitro infused coffee only.
They generally use 1 type of product containers (KEG or Bag-in-Box (BIB)).
There is a need in the industry for a better way to infuse gas and liquid for dispensing beverages in restaurants, coffee shops, bars, and convenience stores, etc.

SUMMARY OF THE PRESENT INVENTION

In summary, the present invention provides an infusion pump having an integration of a gas liquid infusion chamber in the pump and a mixing valve provides simplicity, portability and plug and play benefits. This infusion pump is simple and does not require active monitoring and control of which method is used in a much more complex and expensive system.
The infusion pump can work with multiple liquid container types, e.g. like a keg, BIB and bottle. It also has an auto shut-off feature for an empty container. It uses a float switch for a bottle or a vacuum switch for a keg/BIB.

Due to the nature of the fluid behavior flowing through a small orifice, the volumetric flow rate is almost constant within a wider pressure range as shown in FIG. 2. The present invention takes advantage of this behavior to produce a precise mixture ratio without calibrations.

The precise gas/liquid mixing ratio improves the drink quality and performance consistency from drink to drink and for over a longer period of time. The precise gas/liquid mixing ratios for industrial applications help to control processes more effectively.

Particular Embodiments

By way of example, and according to some embodiments, the present invention may include, or take the form of, an integrated infuser/mixer pump system featuring:
a liquid inlet configured to receive a liquid drawn from a liquid source;
a gas inlet configured to receive an inlet gas from a gas source,
a pump and motor combination configured to received the liquid and provide pumped liquid;
a gas/liquid mixture chamber configured to receive the pumped liquid and the inlet gas, and mix the liquid and the inlet gas into a gas-infused mixture; and
a gas-infused mixture chamber outlet configured to provide the gas-infused mixture;
the gas inlet having a gas liquid mixing valve with a mixing orifice that has a mixing orifice size dimensioned to provide the inlet gas to the gas/liquid mixture chamber with an inlet gas volumetric flow rate in order to mix the pumped liquid and the inlet gas with a predetermined mixture ratio that depends on the mixing orifice size.

Other Features

The infuser/mixer pump system may include one or more of the following features:
The gas liquid mixing valve may be configured inside the gas inlet and is replaceable.
The integrated infuser/mixer pump system may include a gas inlet fitting that is coupled to the gas inlet and has the gas liquid mixing valve configured therein, the gas liquid mixing valve is replaceable within the gas inlet fitting.
The gas inlet fitting may include a check valve configured to prevent backflow of the pumped liquid or the gas-infused mixture.
The gas-infused mixture may be a beverage; the gas includes nitrogen (N2), or carbon dioxide (CO2) or an N2 and CO2 mixture; and the beverage includes an N2 infused beverage, or a CO2 infused beverage, or a blended N2 and CO2 infused beverage.
The gas-infused mixture may be a beverage; the pumped liquid includes coffee, tea, milk, beer, soda, juice, water, beer, wine, or spirit; and the beverage includes a gas-infused coffee, tea, milk, beer, soda, juice, water, beer, wine or spirit beverage.
The integrated infuser/mixer pump system may be an industrial system; the gas-infused mixture is a gas-infused industrial mixture having a desired ratio of the gas and liquid for an industrial process application.
The pump may be configured to drawn the liquid and provide the pumped liquid at a higher pressure.
The integrated infuser/mixer pump system may include a pressure switch configured to sense the pressure of the pumped liquid and turn off the pump if the pumped liquid exceed a sensed pressure threshold.

The integrated infuser/mixer pump system may include an enclosure configured to house the components of the integrated infuser/mixer pump system therein.

BRIEF DESCRIPTION OF THE DRAWING

The drawing, which is not necessarily drawn to scale, includes the following Figures:

FIG. 1 includes FIGS. 1A and 1B showing examples of a Nitrogen Gas-infused Mixing Assembly for Coffee that are known in the art.

FIG. 2 is a graph of flow vs. pressure through small orifices showing different flows for different pressures for different sized orifices.

FIG. 3 shows an isometric view of a box or pump enclosure, e.g., for enclosing therein an integrated infuser/mixer pump system having an infusion pump with an integrated gas liquid infusion chamber, according to some embodiments of the present invention.

FIG. 4 shows an isometric view of an integrated infuser/mixer pump system having an infusion pump for enclosing in the box or pump enclosure shown in FIG. 3, according to some embodiments of the present invention.

FIG. 5 shows a cross section view of a gas inlet fitting coupled to the gas inlet and assembled on the pump head, according to some embodiments of the present invention.

FIG. 6 shows a system plumbing diagram using a vacuum switch, according to some embodiments of the present invention.

FIG. 7 shows a system plumbing diagram using a float switch, according to some embodiments of the present invention.

Similar parts or components in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

FIG. 3 shows a box or pump enclosure generally indicated as 10 for enclosing and containing an integrated infuser/mixer pump system 30 (FIG. 4) with a gas/liquid mixture chamber 46 (FIG. 5), according to some embodiments of the present invention. The box or pump enclosure 10 has a liquid inlet export 12 configured to receive a liquid, a gas inlet export 14 configured to receive an inlet gas, a gas-infused mixture outlet export 16 configured to provide a gas-infused mixture of the gas and liquid from the gas/liquid mixture chamber 46, a power input 18, a switch signal input 20, an On/Off switch 22 and a mounting hole or legs 24. It may also include features to provide quick disconnect fluid/gas connections, mounting holes and legs for ease of installation.

By way of example, FIG. 4 shows an integrated infuser/mixer pump system generally indicated as 30 for enclosing in the box or pump enclosure 10 shown in FIG. 3. The integrated infuser/mixer pump system 30 consists of a pump manifold 31, a pump head 32, a pump motor 34, a liquid inlet export 36, a gas inlet of port 38, a gas-infused mixture chamber outlet of port 40, a pressure switch 42, pump mounting pads 44, and a gas/liquid mixture chamber 46 (FIG. 5) configured inside the gas inlet er port 38 and in relation to the gas-infused mixture chamber outlet export 40. Embodiments are envisioned, and the scope of the invention is intended to include, the integrated infuser/mixer pump system 30 operating as a stand-alone unit.

By way of further example, FIG. 4 shows a fitting assembly that may include quick disconnect features for liquid and fluid ports and a John Guest type connection for a gas port. In FIG. 4, specific connections are shown for simplicity of presentation; However, the fittings can also include quick disconnect, hose bard, John Guest type or any other types of connection.

FIG. 5 shows a gas inlet fitting 50 that may be coupled to the gas inlet of port 38. The gas inlet fitting 50 has its own gas inlet port 50', e.g., for configuring or attaching a quick disconnection consistent with that described herein. The gas inlet fitting 50 also has a gas liquid mixing valve 52 with an integrated fixed mixing orifice 54 and a check valve 56 arranged therein. The integrated fixed mixing orifice 54 has an orifice size, and the gas liquid mixing valve 52 is replaceable, e.g., by screwing it into and out of the gas inlet fitting 50 using a threaded combination generally indicated as 58 as shown. The integrated fixed mixing orifice 54 and its associated orifice size can be replaced or changed to produce certain volumetric flow rates based on particular applications. Built-in check valves like element 56 are incorporated to prevent back flow, but they can be excluded for continuous duty applications with other arrangements.

In FIG. 5, the gas inlet fitting 50 is shown having the gas liquid mixing valve 52 with its integrated fixed mixing orifice 54 as a separate element configured or arranged therein. However, embodiment are envisioned, and the scope of the invention is intended to include, where the gas liquid mixing valve 52 is configured directly into the gas inlet or port 38, e.g., by screwing it into and out of an inner cylindrical surface of the gas inlet or port 38 using a corresponding threaded combination. In other words, the scope of the invention is not intended to be limited to how or where the gas liquid mixing valve 52 is arranged, configured or installed in the gas inlet or port 38.

FIG. 5 also shows a fluid outlet fitting 59 that may be coupled to the gas-infused mixture chamber outlet or port 40, e.g., for configuring or attaching a quick disconnection consistent with that described herein.

FIGS. 6 and 7

FIGS. 6 and 7 show examples of infused drink dispensing systems generally indicated as 60 and 70 that can be built using the integrated infuser/mixer pump system 30, according to some embodiments of the present invention.

For example, FIG. 6 shows an infused drink dispensing system 60 that includes a regulated gas source 60a, a pressurized liquid container/bag-in-box (BIB) 60b coupled to the regulated gas source 60a to provide pressurized liquid, a FOB stop 60c coupled to the pressurized liquid container/bag-in-box (BIB) 60b, a vacuum switch 60d coupled to the integrated infuser/mixer pump system 30, a pressure switch 60e coupled to the integrated infuser/mixer pump system 30, a second regulated gas source 60f coupled to the integrated infuser/mixer pump system 30 to provide pressured gas, and a dispense point 60g configured to receive the gas-infused mixture provided from the integrated infuser/mixer pump system 30.

For example, FIG. 7 shows an infused drink dispensing system 70 that includes a pressurized liquid bottle/container 70a, a float switch 70b coupled to the pressurized liquid bottle/container 70a, the integrated infuser/mixer pump system 30, a pressure switch 70c coupled to the integrated infuser/mixer pump system 30, a regulated gas source 70d coupled to the integrated infuser/mixer pump system 30 and configured to provide pressurized gas, and a dispense point 70e configured to receive the gas-infused mixture provided from the integrated infuser/mixer pump system 30.

The Basic Operation

In operation, the pump head 32 generates suction to draw in liquid from a container like elements 60b, 70a through the liquid inlet port like elements 12, 36. The pump head 32 drives the liquid to a higher pressure and pushes it out to a discharge side of the pump. In the discharge area, the liquid passes through a pressure switch like elements 60e, 70c, depending on the pressure switch setting it can turn the pump on/off. In the discharge area, the liquid gets mixed with the gas coming through the fixed mixing orifice 54 of the integrated gas liquid mixing valve 52. The mixture ratio is controlled by the size of the fixed mixing orifice 54, e.g. installed in the gas inlet fitting 50. For example, if a different mixture ratio is required, then the integrated gas liquid mixing valve 52 having the fixed mixing orifice 52 can be removed and replaced with a different integrated gas liquid mixing valve 52 having a different fixed mixing orifice 54 having a different sized orifice to achieve the desired mixture ratio. The gas-infused mixture exits the pump system 30 through the gas-infused mixture outlet or port 40 (and the gas-infused mixture outlet or port 14 of the box or pump enclosure 10, if used) on to the dispense point like elements 60g, 70e.

The liquid stored in the container can be pressurized, packed in BIB, or can be stored in an open container. Depending on the type of container, one can use an appropriate vacuum or float switch input sensing device for liquid detection as shown in FIGS. 6 and 7.

List All Possible Applications

The infusion pump can be used for gas (N2, CO2, N2+CO2) infused beverages such as coffee, tea, milk, soda, juice, water, beer, wine, spirit, etc. This pump can also be used to mix different gases and liquids to a desired ratio for industrial process applications.

Liquid and Gas Pressure Sensors and Other Devices

Liquid and gas pressure sensors are known in the art, and the scope of the invention is not intended to be limited to any particular type or kind thereof either now known or later developed in the future.

Motor driven pumps, infusion tank/vessels, etc. are also known in the art, and the scope of the invention is not intended to be limited to any particular type or kind thereof either now known or later developed in the future.

Vacuum and float switches are known in the art, and the scope of the invention is not intended to be limited to any particular type or kind thereof either now known or later developed in the future.

The Basic Pump Manifold Configuration

See US 2016/0017882 A1, which corresponds to patent application Ser. No. 14/740,577, filed 16 Jun. 2015 (911-005.075-2 (F-FLJ-X0011US01), which claims benefit to provisional application No. 62/012,526, filed 16 Jun. 2014, which discloses an example of a basic pump manifold configuration having a pump motor and pump head combination, and which are all incorporated by reference in their entirety. In summary, the basic pump manifold combination is configured with a pump head having a diaphragm pump driven by the pump motor to move liquid from a liquid inlet, through inlet channels, through the pump head, through outlet channels, and out a liquid outlet.

The Scope of the Invention

The embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. A pump system comprising:
an integrated infuser/mixer pump system having a pump manifold with
a liquid inlet port configured to receive a liquid drawn from a liquid source;
a gas inlet port having an inner cylindrical surface, and being configured to receive an inlet gas from a gas source;
a pump motor and pump head combination having a pump head and a pump motor and being configured to receive the liquid and provide pumped liquid;
a gas/liquid mixture chamber formed inside the gas inlet port and configured to receive the pumped liquid and the inlet gas, mix the liquid and the inlet gas and provide a gas-infused mixture; and
a gas-infused mixture chamber outlet port configured in relation to the gas/liquid mixture chamber to provide the gas-infused mixture; and
a gas inlet fitting formed as a separate component from the pump manifold and installed directly into the inner cylindrical surface of the gas inlet port of the pump manifold, the gas inlet fitting having a gas liquid mixing valve configured inside the gas inlet fitting and being replaceable, the gas liquid mixing valve having a mixing orifice with a mixing orifice size dimensioned to provide the inlet gas to the gas/liquid mixture chamber with an inlet gas volumetric flow rate in order to mix the pumped liquid and the inlet gas with a predetermined mixture ratio that depends on the mixing orifice size.

2. The pump system according to claim 1, wherein the gas liquid mixing valve is configured to screw into and out of the inner cylindrical surface of the gas inlet fitting using a threaded combination.

3. The pump system according to claim 1, wherein the gas inlet fitting comprises a check valve arranged between the gas/liquid mixture chamber and the gas liquid mixing valve and configured to prevent backflow of the pumped liquid or the gas-infused mixture.

4. The pump system according to claim 1, wherein the gas-infused mixture is a beverage; the gas includes nitrogen (N2), or carbon dioxide (CO2) or an N2 and CO2 mixture; and the beverage includes an N2 infused beverage, or a CO2 infused beverage, or a blended N2 and CO2 infused beverage.

5. The pump system according to claim 1, wherein the gas-infused mixture is a beverage; the pumped liquid includes coffee, tea, milk, beer, soda, juice, water, beer, wine, or spirit; and the beverage includes a gas-infused coffee, tea, milk, beer, soda, juice, water, beer, wine or spirit beverage.

6. The pump system according to claim 1, wherein the pump motor and pump head combination is configured to draw the liquid and provide the pumped liquid at a higher pressure.

7. The pump system according to claim 1, wherein the integrated infuser/mixer pump system comprises a pressure switch configured to sense the pressure of the pumped liquid and turn off the pump if the pumped liquid exceeds a sensed pressure threshold.

8. The pump system according to claim 1, wherein
the liquid inlet port is configured to attach a quick disconnection to receive the liquid;
the gas inlet fitting is configured to attach a corresponding quick disconnection to receive the inlet gas; and
the gas-infused mixture chamber outlet port is configured to attach an associated quick disconnection to provide the gas-infused mixture.

9. The pump system according to claim 1, wherein the integrated infuser/mixer pump system is arranged, enclosed and contained in a box or pump enclosure.

* * * * *